United States Patent

[11] 3,601,152

| [72] | Inventor | Grant F. Kenworthy |
| | | 1688 Chestnut, Des Plaines, Ill. 60018 |
| [21] | Appl. No. | 850,436 |
| [22] | Filed | Aug. 15, 1969 |
| [45] | Patented | Aug. 24, 1971 |

[54] UNIDIRECTIONAL FLOW VALVE
7 Claims, 3 Drawing Figs.

[52] U.S. Cl. ................................................. 137/525
[51] Int. Cl. .............................................. F16k 15/14
[50] Field of Search .......................................... 137/525, 551, 112

[56]                 References Cited
                 UNITED STATES PATENTS

| 2,284,051 | 5/1942 | Gilbert | 137/525 |
| 2,591,148 | 4/1952 | Green | 137/525 |
| 2,925,090 | 2/1960 | Bauerlein | 137/525 |
| 3,010,477 | 11/1961 | Graham | 137/525 |
| 3,185,128 | 5/1965 | Moore | 137/551 |
| 3,267,950 | 8/1966 | Langdon | 137/112 |

FOREIGN PATENTS

| 209,641 | 8/1957 | Australia | 137/525 |

*Primary Examiner*—Laverne D. Geiger
*Assistant Examiner*—William H. Wright
*Attorney*—Hill, Sherman, Meroni, Gross & Simpson ABSTRACT: A nipple is engaged by a generally cup-shaped elastomeric one-way flow control member to block flow of fluid in reverse through the discharge end of the nipple but permits fluid flow from the discharge end of the nipple by elastic expansion of a nipple-embracing sleeve. During flow from the nipple the control member is retained in position relative to the nipple to enable quick resumption of reverse flow blocking engagement with the nipple.

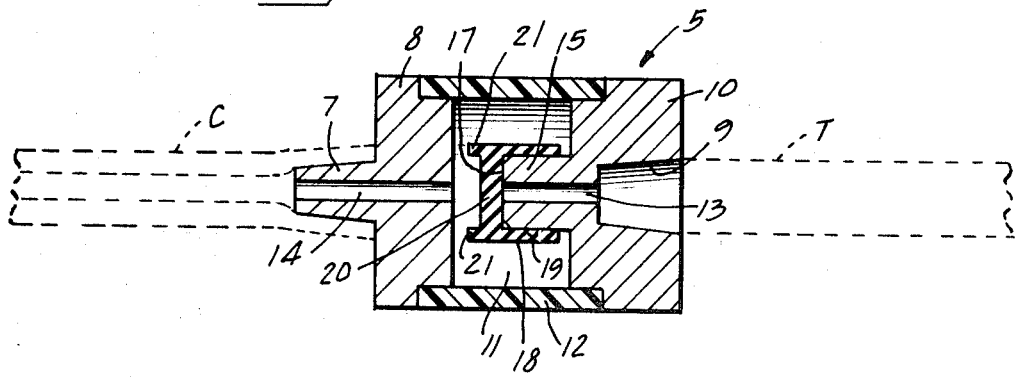
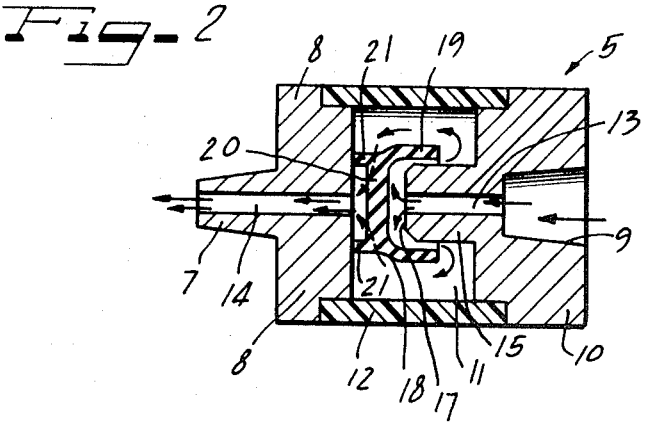
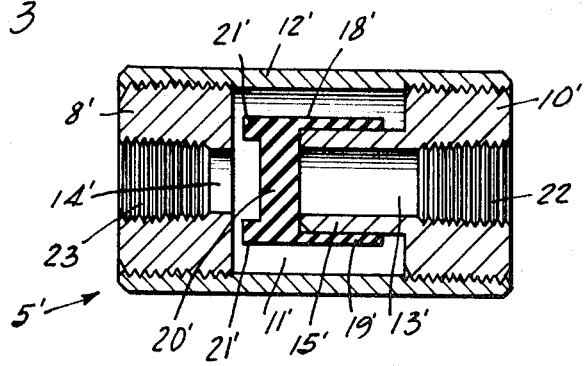
INVENTOR
GRANT F. KENWORTHY

UNIDIRECTIONAL FLOW VALVE

This invention relates to unidirectional flow valve structures and is more particularly concerned with such structures which can be adapted for a wide range of pressure responsiveness.

Heretofore so-called check valves permitting flow through a passage in one direction and blocking flow in the opposite direction have generally consisted of relatively movable fixed dimensional elements such as valve disks, rings, balls, poppets, and the like, often spring biased, and generally requiring fairly accurate seating faces on and between the valve member and its associated element or elements of the assembly. Slow response under conditions of light bias loading, slow biasing spring return action, liability of wear and leakage, liability of improper seating of the valve, possible lodging of foreign particles between the valve and the seat, and the like, are among the deficiencies of prior constructions. It is especially difficult to attain quick opening flow response with prior devices where relatively low pressures on the order of 2 or 3 ounces per square inch pressures are involved in the flow stream, and it is equally difficult to attain quick closing, antisurge of the prior valve devices where they are sufficiently sensitive to open responsive to such low pressures.

According to the present invention, the foregoing and other disadvantages, shortcomings, inefficiencies and problems are overcome by providing a new and improved unidirectional flow valve structure in which a nipple is engaged by a generally cup-shaped elastomeric one-way flow control member to block flow of fluid in reverse through the discharge end of the nipple but permits fluid flow from the discharge end of the nipple by elastic expansion of a nipple-embracing sleeve. During flow from the nipple the control member is retained in position relative to the nipple to enable quick resumption of reverse flow blocking engagement with the nipple.

An important object of the present invention is to provide a new and improved unidirectional flow valve construction which is quick acting both in flow responsiveness and in shutoff.

Another object o of the invention is to provide a new and improved unidirectional flow-controlling valve structure embodying an elastically responsive member.

A further object of the invention is to provide a new and improved unidirectional flow control valve structure readily adaptable for a wide range of pressure responsiveness.

Still another object of the invention is to provide a new and improved unidirectional flow-controlling valve structure especially suitable for low-pressure applications.

A still further object of the invention is to provide a novel quick-acting unidirectional flow control valve structure.

Other objects, features and advantages of the invention will be readily apparent from the following description of certain preferred embodiments thereof, taken in conjunction with the accompanying drawings although variations and modifications may be effected without departing from the spirit and scope of the novel concepts of the disclosure, and in which:

FIG. 1 is an illustrative longitudinal sectional view through a valve assembly embodying features of the invention;

FIG. 2 is a similar longitudinal sectional view illustrating the valve in an open, flow through condition; and FIG. 3 is a longitudinal sectional view through a modification.

Although the present invention is useful under conditions of high pressures, it is especially advantageous for controlling reverse flow in fluid systems, whether hydraulic or pneumatic, in which very low fluid pressures are involved. For example, in medical and veterinary medicine transfusion and infusion apparatus operate at a low pressure, on the order of 2 to 3 ounces per square inch in the tube connected between the solution container and the catheter. When the container has emptied or the pressure head otherwise diminishes or ceases, venous back pressure could cause return flow through the catheter which could result in blood loss or blood clotting in the catheter. Accordingly, the invention may be embodied in a capsular unit 5 (FIGS. 1 and 2) adapted to be connected to and between a catheter C and a connecting tube T leading from a solution container. As is common practice, the catheter and tube may be of plastic tubing. For connection to the unit 5 of the catheter, a connecting nipple 7 may be provided on an end member 8 and onto which an end of the catheter is adapted to be engaged by insertion of the nipple into such end in an interference fit. A slightly tapered socket 9 may be provided on an opposite end member 10 of the unit and located coaxially in line with the nipple 7 and receptive of an end of the tube or a nozzle type connector thereon inserted in a press fit relation into the socket.

In a desirable construction, the capsular unit 5 comprises a valve chamber 11 between the end members 8 and 10 enclosed by a spacer sleeve 12 suitably secured in fluidtight relation to and between the end members. A simple interference fit between the spacer and the end members may suffice or they may be otherwise secured together such as by cementing or bonding where the elements are of plastic. Preferably the spacer and chamber enclosing member 11 in this instance is of a clear, transparent plastic so that ready inspection of the chamber 11 is enabled from the outside of the unit. Communication with the chamber 11 from the socket 9 is effected through a passage bore 13 coaxial with the socket. Discharge from the chamber 11 is enabled through a passage bore 14 through the end member 8 and the nipple 7.

To control fluid flow to be in one direction only, namely in through the passage 13 and out through the passage 14 and block reverse flow, unidirectional flow valve means are provided within the chamber 11 comprising a nipple 15 extending inwardly from the end member 10 and providing an elongated extension of the passage bore 13 to and through an inner blunt discharge end 17 on the nipple. Preferably the nipple is substantially cylindrical although if preferred for various purposes it may be tapered or flared.

Engaged on the nipple 15 to block flow thereinto through the discharge end 17 is a generally cup-shaped elastomeric one-way flow-controlling valve member 18. This member has a sleeve portion 19 which is open at one end and is of differentially smaller inside diameter than the outside diameter of the nipple to engage the same in telescoped interference fit embracing relation. At and across its opposite end the sleeve 19 has a closure web 20 confronting the discharge end 17 of the nipple and normally blocking fluid flow in either direction through said discharge end. Under predetermined pressure head impressed through the passage 13 onto the interior of the sleeve 19 by way of the discharge end 17, the valve sleeve 19 expands elastically to open a flow passage from the discharge end and past the nipple and from the open end of the sleeve into the chamber 11, as shown illustratively in FIG. 2. For this purpose, the valve member 18 is made from a suitable elastomeric material which may be natural rubber, but to meet various usages in which it must be chemically inert may desirably be made from a synthetic rubber or plastic material of suitable elasticity. For this purpose, a suitable durometer of the elastomeric material calculated with respect to the size of the valve and the pressure responsiveness desired is selected. For example, where the valve must respond to very low pressures on the order of 2 to 3 ounces, a very low durometer material is employed. Correspondingly higher durometer materials may be employed for higher pressures in order to avoid collapse under the pressure head to which the valve may be subjected in use. Whatever the pressure for which the valve may be intended; during expansion of the sleeve 19 it should open a sufficient gap passageway between the valve member and the nipple which will approximate in cross-sectional flow area the passage 13 where free flow through the valve assembly is desired or which will assume any preferred modulating or flow-throttling expanded relation, as may be best suited for the intended purpose. On the other hand, the end closure 20 is preferably substantially thicker and/or stiffer than the sleeve 19 so as to resist deformation in the presence of line pressure. This is desirable for one reason to avoid drawing in of the attached end of the sleeve 19 during imposition of pressure fluid thrust on the interior of the valve member as would be experienced if the end closure could elongate in the direction of fluid flow. By virtue of the greater stiffness of the end closure 20, therefore, the valve sleeve 19 is adapted to expand reasonably uniformly under line pressure. Further, upon dropping of the fluid pressure below a predetermined minimum, the valve sleeve 19 immediately closes onto and effects a substantially sealing engagement with the nipple 15. Since expansion of the sleeve 19 is substantially uniformly radially outward, contraction into sealing engagement with the nipple is also substantially uniform, and may be with a virtually instantaneous snap action where there is an abrupt pressure stoppage.

Under the force of fluid pressure from the passage 13 toward the end closure 20 and release of the sleeve 19 from its contractile grip on the nipple 15, there is, of course, a forward thrust on the valve member 18 tending to move the end closure 20 into spaced relation to the discharge end 17 of the nipple. However, the confronting inner face of the end closure 8 serves as stop means to limit the extent of unseating forward movement of the valve member, the spacing of the stop surface from the discharge end 17 of the nipple being such as to enable displacement of the end closure 20 sufficiently spaced from the discharge end 17 to afford a desirable flow gap passage correlated in respect to the expansion of the sleeve 19 under the anticipated pressures to attain the desired results, whether free flow, as indicated in FIG. 2, or a metered or throttled flow, depending on the intended results. In order to maintain a free flow of the fluid from the chamber 11 out through the passage 14, suitable spacer means are provided between the stop surface of the end member 8 and the end closure 20, conveniently comprising spaced forward projections 21 integral with and located at diametrically opposite sides of the end closure 20. Thereby a gap is maintained between the stop surface and the end closure 20 through which fluid can pass from the chamber 11 from opposite sides into the gap between the spacer projections 21. This construction also takes advantage of the relatively heavy or at least deformation resistance of the end closure 20 under pressure fluid thrust so that it will not cave out or deflect under the fluid pressure from the passage 13 to block the entry end of the passage 14.

Since the length of the sleeve 19 is substantially greater than the range of movement permitted for the end closure 20 relative to the discharge end 17 of the nipple, there is a substantial longitudinal extent of the valve sleeve 19 in annular confronting relation to the nipple even in the forwardmost portion of the valve member 18. Hence, when the valve sleeve 19 resumes its flow-blocking engagement with respect to the nipple an effective seal against reverse flow from the chamber 11 is afforded. Should there be a back surge exerted through the passage 14, pressure exerted against the end closure 20 of the valve member will thrust it rearwardly and thus increase the sealing grip of the sleeve 19 on the nipple and also thrust the end closure 20 against the discharge end 17 for further sealing area contact of the valve with the nipple to increase the backflow preventing seal of the valve member with the nipple 15. The greater the backflow surge pressure, the more tightly will be the sealing gripping engagement of the valve member 18 with the nipple.

Advantages of the valve unit 5 for uses wherein reverse flow must be prevented from the site to which a fluid is to be delivered are readily appreciated. Without special attention, reverse flow is instantly and positively blocked by closing of the flow passage by the valve member 18 when the fluid delivery pressure falls below the predetermined minimum. Further, by having the chamber wall 12 transparent, functioning of the valve can be observed. These advantageous features are especially valuable for transfusion and infusion purposes which involve low pressure and a slow rate of flow. The doctor or attendant may start the transfusion or infusion and then go about other business and the valve will automatically shut off and prevent backflow when the supply of solution is exhausted. Further, should it be necessary to connect the catheter to another supply container, that can be quickly accomplished by disconnecting and connecting supply tubes without any backflow loss.

In FIG. 3 a unidirectional flow valve 5' is shown which in general respects is the same as and functions the same as the valve unit 5 and corresponding elements are therefore identified by primed similar reference numerals, it being understood that, unless specifically mentioned, the description in respect to the elements identified by the corresponding primed reference numerals is the same as for the corresponding elements of the unit 5. Differences that may be noted in the unit 5' are that the end members 8' and 10' are threadedly engaged in respective opposite ends of the body tube 12' by threaded interengagement; the passages 13' and 14' are of larger diameter to accommodate larger volume flow and have respectively tapped outer end portions 22 and 23 to receive threaded nipple-type connectors; the valve member 18' is of larger diameter consistent with larger diameter of the nipple 15'; and the end closure 20', as well as the spacer projections 21', is of a heavier section to accommodate higher pressures.

Numerous and varied used and adaptations will readily suggest themselves for valves embodying the features of the present invention.

I claim as my invention:

1. A unidirectional flow valve structure, comprising: a tubular spacer body having opposite end closures spaced apart and providing a closed chamber; said end closures being imperforate except for aligned passages therethrough and a nipple comprising an extension of the passage of one of said end closures into said chamber, with the discharge end of the nipple substantially spaced from the other of said end closures; a generally cup-shaped elastomeric one-way flow-controlling valve member having a sleeve portion shorter than said nipple but longer than the space between said nipple and said other end closure and open at one end and telescoped in releasable contractile fluid-sealing embracing fit engagement about said nipple; a closure web of substantially thicker cross section than said sleeve so as to be substantially resistant to pressure fluid deformation under pressures which will cause elastic expansion of the sleeve in response to internal fluid pressure applied thereto by discharge from said nipple to open a flow passage from said discharge end past the nipple from said open end of the sleeve portion into said chamber; said other end closure providing a stop surface toward which said web moves away from said discharge end responsive to thrust of fluid from said discharge end for thereby effecting a fluid escaped spaced relation between the nipple and the web and the fluid-expanded sleeve portion into said chamber; and spacer means between said web and said stop surface to provide a gap between said web and said stop surface for flow between said chamber and said passage in said other end closure and enabling quick sealing thrust of said web toward and against said discharge end of the nipple and sealing contraction of the sleeve portion about said nipple when a back pressure develops through said passage of said other closure.

2. A valve structure according to claim 1, in which said tubular body is a transparent spacer sleeve to enable ready inspection of said chamber from outside the valve structure.

3. A valve structure according to claim 2, in which said sleeve and said end closures are secured together by interference fit.

4. A valve structure according to claim 2, in which said sleeve and end closures are plastic elements bonded together.

5. A valve structure according to claim 1 adapted for medical and veterinary medicine transfusion and infusion apparatus operating at a low pressure on the order of 2 to 3 ounces per square inch and wherein the valve member is constructed of a very low durometer material, said passage in said one end closure having means for attachment communication with a tube leading from a solution container, and said passage in said other end closure having means for connecting in communication therewith an end of a catheter.

6. A valve structure according to claim 1, including a tapered socket in the outer end portion of the passage in said one end closure for reception in press fit relation of means for connecting a tube in communication with such passage, and a tapered nipple extending from the outer end of said other end closure and providing an extension of the passage in said other end closure and adapted to receive an end of a catheter thereon in interference fit.

7. A valve structure according to claim 1, wherein said end closures comprise members threadedly engaged in respective opposite ends of said tubular spacer body, and respective tapped outer end portions of said passages being adapted to receive threaded nipple-type connectors.

UNITED STATES PATENT OFFICE
CERTIFICATE OF CORRECTION

Patent No. 3,601,152　　　　　　　　Dated August 24, 1971

Inventor(s) Grant F. Kenworthy

It is certified that error appears in the above-identified patent and that said Letters Patent are hereby corrected as shown below:

Column 1, line 42, delete "o";
    Column 3, line 50, for "portion", read --position--.

Signed and sealed this 30th day of May 1972.

(SEAL)
Attest:

EDWARD M. FLETCHER, JR.　　　　　　　ROBERT GOTTSCHALK
Attesting Officer　　　　　　　　　　　Commissioner of Patents